July 2, 1935.  G. F. MUSTER  2,006,602
PACKING
Filed Dec. 8, 1933
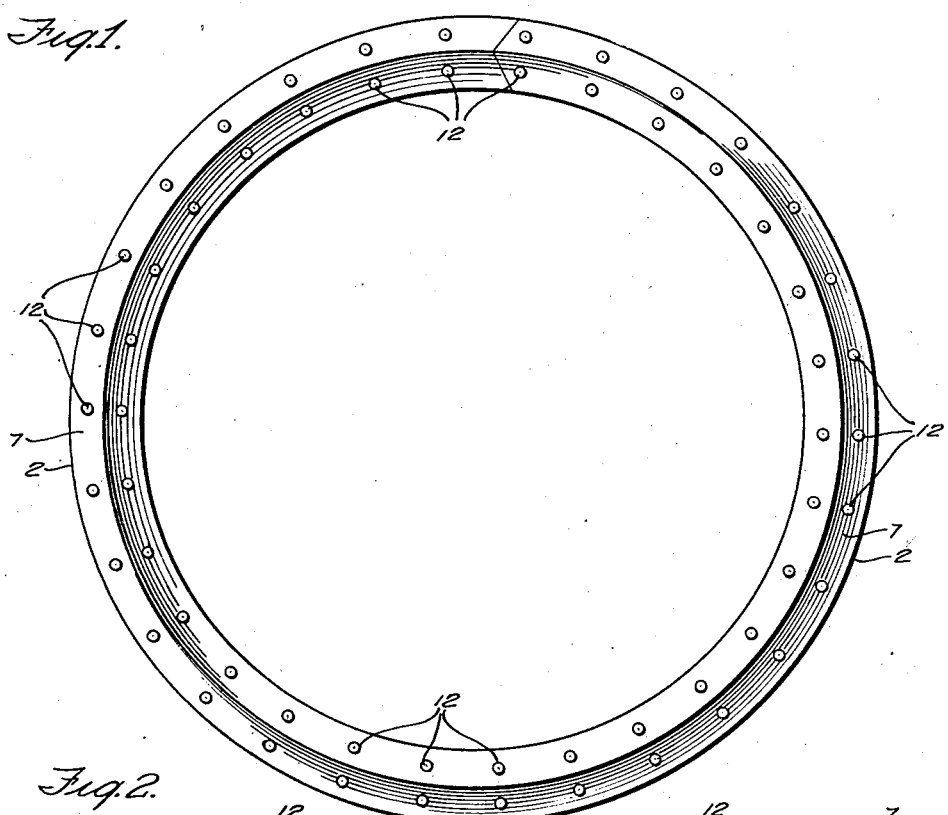
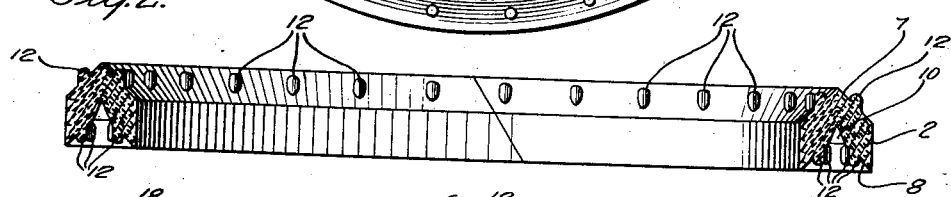
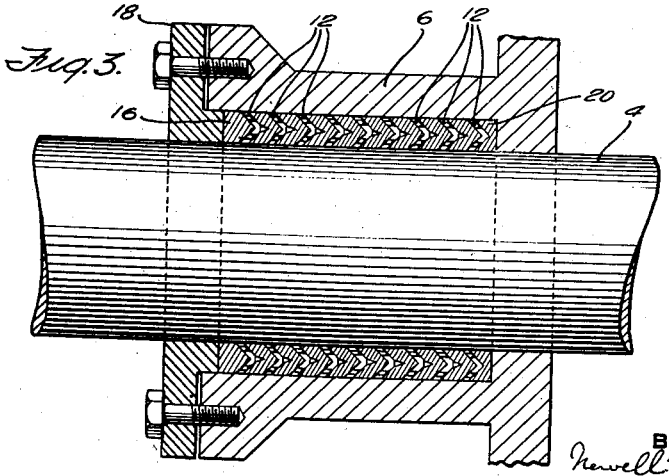
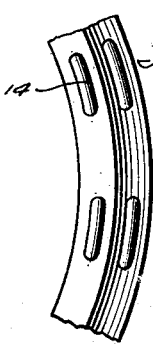
INVENTOR
GERALD F. MUSTER
BY
ATTORNEYS Patented July 2, 1935

2,006,602

UNITED STATES PATENT OFFICE 2,006,602

PACKING

Gerald F. Muster, Elmhurst, N. Y.

Application December 8, 1933, Serial No. 701,441

6 Claims. (Cl. 288—1)

This invention relates to packing, and particularly to packing of the type employed in stuffing boxes and the like to effect a liquid or vapor-tight seal about a reciprocating rod, and a general object of the invention is to provide an improved type of packing which will not only have increased sealing efficiency, but greater life than packings heretofore employed.

Packing has heretofore been employed which comprises an annular packing ring having one edge molded into the form of a V and the other edge provided with a substantially V-shaped recess so that successive rings may be nested in the packing gland, the pressure of one ring tending somewhat to spread the wings of the V-shaped recess in the next ring. An objection to this construction is that the close nesting of the successive V's makes a substantially smooth continuous packing surface which eventually loses its effectiveness since there is nothing except the original gland pressure which tends to hold the packing constantly in engagement with the reciprocating part.

In order to provide for renewal of the pressure of the packing against the reciprocating part from time to time, attempts have been made so to spread the V as to form a slight gap between the successive V's as, for example, by making the angle of the apex of the V-shaped recess somewhat more acute than the angle between the remaining parts of the two wings of the V, thereby causing a slight opening between the V projection of one ring and the V recess of the next. One of the objects of the present invention is so to improve rings of this type that there will be assurance at all times of sufficient space between the V's of successive rings to permit the entrance of the liquid, which may seep by the gland end into the space between the V's, thus tending to increase the pressure of the packing against the reciprocating part and the sealing action of the same.

To this end there is preferably provided upon the surfaces of at least one of the V's, either the V projection or the V recess, or upon the surfaces of both, projections, preferably spaced about the annulus, which serve as spacers between the successive rings while permitting liquid to pass between them into the interstices between the rings.

Other objects and important features of the invention will appear from the following description and claims when considered in connection with the accompanying drawing, in which Figure 1 is a plan view of a packing ring embodying the present invention;

Figure 2 is a transverse section through the ring shown in Figure 1;

Figure 3 is a section through a stuffing box packed with the packing rings of the present invention, and Figure 4 is a detail view showing a modification of the form and arrangement of the spacing projections.

In the illustrative embodiment of the invention, the packing ring 2, which may be formed of the usual steam or oil packing material such, for example, as that made out of layers of rubber impregnated fabric, is provided with cylindrical inner and outer surfaces to engage respectively the reciprocating rod 4 and the inner wall of the stuffing box or gland 6, and has one of its edges formed into substantially V shape as shown at 7 and has its other edge provided with a V shaped recess as shown at 8, the V shaped recess having that part of its inclined surfaces nearest the edge of the ring inclined at substantially the same angle as the surfaces of the V projection 7 and carried up to a more acute angle at 10. The shaping of the recess in this manner insures that when the V edge 7 of one packing ring enters the V recess 8 of the next ring it will tend to exert a spreading action on the wings or sides of the V shaped recess and thus fill the space between the inner wall of the gland 6 and the surface of the reciprocating rod 4. It also has a tendency to cause the surface of the recess 8 to move away from the surface of the V projection 7 near its edge thus opening a slight crevice between successive rings into which the liquid which may seep by the end wall of the stuffing box into the packing will find its way and by increasing the outward pressure on the packing increase the sealing action.

This action of the packing cannot, however, be relied upon alone. The constant reciprocation of the rod 4 tends eventually to bring the two adjacent inclined surfaces together and thus the sealing action becomes gradually less effective. A particular object of the present invention is to overcome this tendency of the surfaces of the recesses 8 in successive rings to approach an intimate contact relation with the adjacent surfaces of the V projections 7 and thus prevent access of the liquid to the spaces between successive rings.

In the illustrative embodiment of the invention, a spacing of the successive rings sufficient to insure access of liquid to the spaces between them is made certain by providing at least one of the adjacent surfaces with projections 12 preferably molded up from the material of which the packing is composed, these projections 12 serving as spacers to prevent complete nesting of the successive rings. In the ring shown in the drawing, projections 12 are provided not only on the outer V 7 but also on the inner V 8 and in the preferred embodiment these are shown merely as rounded projections spaced at short distances about the entire circle of the ring so as to provide spaces for the liquid to go between them and also spaces for the projections on the V shaped recess to be staggered between the projections of the V edge.

In Figure 4 is shown a modification of the projections, the projections 14 shown in Figure 4 being elongated but still so spaced that liquid may pass between them and that the projections of the V shaped recess may be staggered with respect to them when the successive rings are arranged in partially nested relation to each other in the stuffing box or gland 6.

If desired, end rings may be provided which are not of the double V construction. For example, at one end of the gland may be located a ring 16 having on one edge a flat face to engage the compressor 18 of the gland, the ring 16 being, however, provided with projections 12 on its V face the same as the double V rings. At the other end of the gland may be located a ring 20 having one flat face and a substantially V shaped recess also provided with projections 12.

It will be understood that the utility of the invention is not confined to nesting or partially nesting packings in which the interfitting edges are necessarily of a shape which might technically be called V-shaped in cross section. As will readily be apparent, many of the advantages of the invention, that is, many of the advantages of the employment of projections to prevent complete nesting may be obtained when the projections are employed with nesting or partially nesting packings in which the interfitting edges are of other cross sections than substantially V-shaped.

What I claim as new is:

1. Packing for the purposes described, comprising packing rings each having one edge molded into substantially V-shape and the opposite edge shaped to provide substantially V-shaped recess, at least one of said edges being provided with a plurality of circumferentially spaced projections from the two sides of the V.

2. Rod and gland packing comprising packing material molded into annular shape and having a cross section showing a projecting V on one edge and a substantially V-shaped recess on the other edge, whereby successive rings of packing material may be partially nested, the two surfaces of at least one of said V's being provided at spaced points throughout its annular extent with projections to prevent complete nesting.

3. Packing particularly designed for reciprocating rods and the like comprising annular rings of packing material each provided with a substantially V-shaped recess in one edge and a substantially V-shaped projection on the other edge, said V-shaped recess having near its apex an angle more acute than the angle of the V projection whereby, when successive rings are nested and subjected to gland pressure, the V-shaped projection of one ring tends to spread the wings of the V-shaped recess of the next ring, each of said rings being provided at spaced points throughout the annular extent of at least one of said pairs of V surfaces with elevations from the surfaces of the V which serve to prevent complete nesting of the successive rings.

4. Packing in ring form for the purposes described having one edge recessed and having the opposite edge shaped substantially to nest in the correspondingly recessed edge of a second piece of said packing, lateral projections being provided at spaced intervals throughout the extent of one of said edges to prevent complete nesting while providing clearance for the introduction of liquid between said rings into packing spreading relation to both the inner and outer faces of the approximately nesting edges thereof.

5. Packing in ring form for the purposes described having one edge recessed and having the opposite edge shaped substantially to nest in the correspondingly recessed edge of a second piece of said packing, one of said internesting edges being provided throughout its extent with lateral projections so located on opposite sides of its median line as to prevent complete nesting while providing clearance for the introduction of liquid between said rings into packing spreading relation to both the inner and outer faces of the approximately nesting edges thereof.

6. Packing in ring form for the purposes described, said packing having one edge recessed and having the opposite edge shaped substantially to nest in the correspondingly recessed edge of a second piece of said packing, one of said internesting edges being provided throughout its extent with a plurality of individual lateral projections so located on opposite sides of its median line and so spaced both laterally and longitudinally of said packing as to prevent complete nesting while permitting free circulation of the fluid between the adjacent packing surfaces from the shaft-engaging face to the outer face thereof to insure a constant spreading action on the recessed edge of said packing.

GERALD F. MUSTER.